United States Patent
Chen et al.

(10) Patent No.: US 11,960,111 B2
(45) Date of Patent: Apr. 16, 2024

(54) BACKLIGHT FOR A DISPLAY HAVING AN OPTICAL FILM WITH FIRST AND SECOND PRISM STRUCTURES DISPOSED ON OPPOSING OPTICAL SURFACES THEREOF, OR BACKLIGHT FOR A DISPLAY HAVING AN OPTICAL FILM SET WITH FIRST AND SECOND PRISM STRUCTURES DISPOSED ON OPPOSING OPTICAL FILMS

(71) Applicant: Radiant Opto-Electronics Corporation, Kaohsiung (TW)

(72) Inventors: Wei-Hsuan Chen, Kaohsiung (TW); Chung-Yung Tai, Kaohsiung (TW); Chun-Yi Wu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/056,241

(22) Filed: Nov. 16, 2022

(65) Prior Publication Data

US 2023/0194769 A1 Jun. 22, 2023

Related U.S. Application Data

(63) Continuation of application No. PCT/CN2022/087502, filed on Apr. 18, 2022.

(30) Foreign Application Priority Data

Dec. 21, 2021 (CN) .......................... 202111569058.4

(51) Int. Cl.
*F21V 8/00* (2006.01)

(52) U.S. Cl.
CPC ......... *G02B 6/0053* (2013.01); *G02B 6/0088* (2013.01); *G02B 6/009* (2013.01)

(58) Field of Classification Search
CPC ......... G02B 5/04; G02B 5/045; G02B 6/0053
See application file for complete search history.

(56) References Cited

U.S. PATENT DOCUMENTS

| | | | |
|---|---|---|---|
| 2014/0185273 | A1 | 7/2014 | Tsai et al. |
| 2014/0286044 | A1* | 9/2014 | Johnson ............... G02B 5/0278 362/330 |
| 2021/0286214 | A1 | 9/2021 | Chen et al. |

FOREIGN PATENT DOCUMENTS

| | | |
|---|---|---|
| CN | 101329414 A | 12/2008 |
| CN | 101526691 A | 9/2009 |
| CN | 102033253 A | 4/2011 |
| CN | 106226849 A | 12/2016 |
| CN | 112015000 A | 12/2020 |
| CN | 213069418 U | 4/2021 |
| JP | 2001093316 A | 4/2001 |

(Continued)

*Primary Examiner* — Robert J May
(74) *Attorney, Agent, or Firm* — CKC & Partners Co., LLC

(57) ABSTRACT

An optical film, an optical film set, a backlight module and a display device are provided. The optical film includes a main body, plural first prism structures and plural second prism structures. The main body has a first optical surface and a second optical surface. The first prism structures are disposed on the first optical surface. Each of the first prism structures extends along a first direction. The second prism structures are disposed on the second optical surface. Each of the second prism structures extends along a second direction. The first direction is different from the second direction.

20 Claims, 14 Drawing Sheets

(56) References Cited

FOREIGN PATENT DOCUMENTS

| TW | 200925509 A | 6/2009 |
|---|---|---|
| TW | 201250298 A | 12/2012 |
| TW | 201305628 A | 2/2013 |
| TW | M608390 U | 3/2021 |

\* cited by examiner

BACKLIGHT FOR A DISPLAY HAVING AN OPTICAL FILM WITH FIRST AND SECOND PRISM STRUCTURES DISPOSED ON OPPOSING OPTICAL SURFACES THEREOF, OR BACKLIGHT FOR A DISPLAY HAVING AN OPTICAL FILM SET WITH FIRST AND SECOND PRISM STRUCTURES DISPOSED ON OPPOSING OPTICAL FILMS

RELATED APPLICATIONS

This application is a continuation application of International Application No. PCT/CN2022/087502, filed on Apr. 18, 2022, which claims priority of China Application No. 202111569058.4, filed on Dec. 21, 2021. The entire disclosures of all the above applications are hereby incorporated by reference.

BACKGROUND

Field of Invention

The present disclosure relates to an optical film and its application. More particularly, the present disclosure relates to an optical film and an optical film set which can produce greater viewing angle, a backlight module and a display device of using the optical film and the optical film set.

Description of Related Art

Display devices for automobiles have a viewing standard defined by Europe Union (Deutsches Flachdisplay Forum) due to the consideration of the viewing angles of a driver and a front passenger. Therefore, all of the specifications of the current automobile products are designed based on this standard.

Presently, prism sheets used in the backlight module are mainly used to concentrate light in a normal direction of a front view. However, since the display device for automobiles is disposed under a line of sight, the center informative display (CID) needs to be designed to be viewed by both the driver and the front passenger. Therefore, the standard of the viewing angle is on the upper side (an upper viewing angle is within 20 degrees, and a lower viewing angle is 15 degrees) and has a wider distribution in a left viewing angle and a right viewing angle (the left viewing angle and the right viewing angle are within 50 degrees), which is significantly different from the requirements of the viewing angle of general tablet computers or notebook computers.

Generally speaking, even though the viewing angle can be narrowed by using a privacy filter, an energy loss of the privacy filter is extremely large. If a luminance at a large viewing angle can achieve desired value by increasing the overall luminance, but there is a problem of power consumption which comes along with high luminance. Accordingly, a motivation of the present invention is how to create an optical film which can conform to the specific viewing angle and the specific luminance and also can save the electric power when it is applied to a display device.

SUMMARY

Accordingly, an objective of the present disclosure is to provide an optical film and an optical film set which can be applied in a backlight module and a display device, so as to conform the specific viewing angle.

According to the aforementioned objectives of the present disclosure, an optical film is provided. The optical film includes a main body, plural first prism structures and plural second structures. The main body has a first optical surface and a second optical surface opposite to each other. The first prism structures are disposed on the first optical surface, in which each first prism structure has a first extending direction. The second prism structures are disposed on the second optical surface, in which each second prism structure has a second extending direction. The first extending direction is different from the second extending direction.

According to one embodiment of the present disclosure, the aforementioned first prism structures has an arrangement density Y, each first prism structure has a first side surface and a second side surface connected to the first side surface, and an included angle is formed between the first side surface and the second side surface, in which the arrangement density Y and the included angle X satisfy a relation, the relation is:

$$Y \geq 0.441 + 0.01249X - 3.2875*10^{-4}X^2 + 1.95833*10^{-6}X^3.$$

According to one embodiment of the present disclosure, a blank portion is formed between every adjacent two of the aforementioned first prism structures, and the arrangement density Y is calculated according to a function, in which the function is $Y=(P_1-W_1)/P_1$, in which $P_1$ is a pitch between every adjacent two of the first prism structures, and $W_1$ is a width of each of the blank portions.

According to one embodiment of the present disclosure, each aforementioned first prism structure is a concave stripe structure recessed into or a convex stripe structure protruding from the first optical surface.

According to one embodiment of the present disclosure, the aforementioned included angle between the first extending direction and the second extending direction is 90 degrees.

According to one embodiment of the present disclosure, after a light enters the main body from one of the first optical surface and the second optical surface, and is emitted from another one of the first optical surface and the second optical surface, a portion of the light is emitted along a front view direction, another portion of the light is emitted along a side view direction, in which a ratio of a light luminance from the side view direction to a light luminance from the front view direction is greater than 0.4, including an endpoint value.

According to one embodiment of the present disclosure, the aforementioned front view direction is parallel to a light emitting normal line of the optical film, and an included angle between the side view direction and the light emitting normal line is greater than 40 degrees, including an endpoint value.

According to the aforementioned objectives of the present disclosure, a backlight module is provided. The backlight module includes a light guide plate, a light source, the aforementioned optical film and a film set. The light guide plate has a light incident surface and a light emitting surface. The light source is disposed near the light incident surface. The optical film is disposed in front of the light emitting surface. The film set is located between the optical film and the light guide plate.

According to the aforementioned objectives of the present disclosure, a backlight module is provided. The backlight module includes a light source and the aforementioned optical film. The light source includes a substrate and plural light emitting units arranged on the substrate. The optical film is disposed in front of the light source.

According to the aforementioned objectives of the present disclosure, a display device is provided. The display device includes the aforementioned backlight module and a display panel. The display panel is disposed in front of the backlight module.

According to the aforementioned objectives of the present disclosure, an optical film set is provided. The optical film set includes a first film and a second film. The first film has a first optical surface and plural first prism structures, in which the first prism structures are disposed on the first optical surface, and each first prism structure has a first extending direction. The second film has a second optical surface and plural second prism structures, in which the first optical surface and the second optical respectively face opposite directions, the second prism structures are disposed on the second optical surface, and each second prism structure has a second extending direction. The first extending direction is different from the second extending direction.

According to the embodiments of the present disclosure, it is known that the present disclosure mainly uses the design of the first prism structures and the second prism structures on the optical film or on the optical film set to turn a portion of light into other viewing angle directions, thereby increasing the overall field of view. A specific viewing angle can be achieved without increasing the current to level up the entire luminance.

BRIEF DESCRIPTION OF THE DRAWINGS

For a better understanding of the embodiments and their advantages, reference is now made to the following description taken in conjunction with the accompanying drawings, in which.

DETAILED DESCRIPTION

Figure 1:
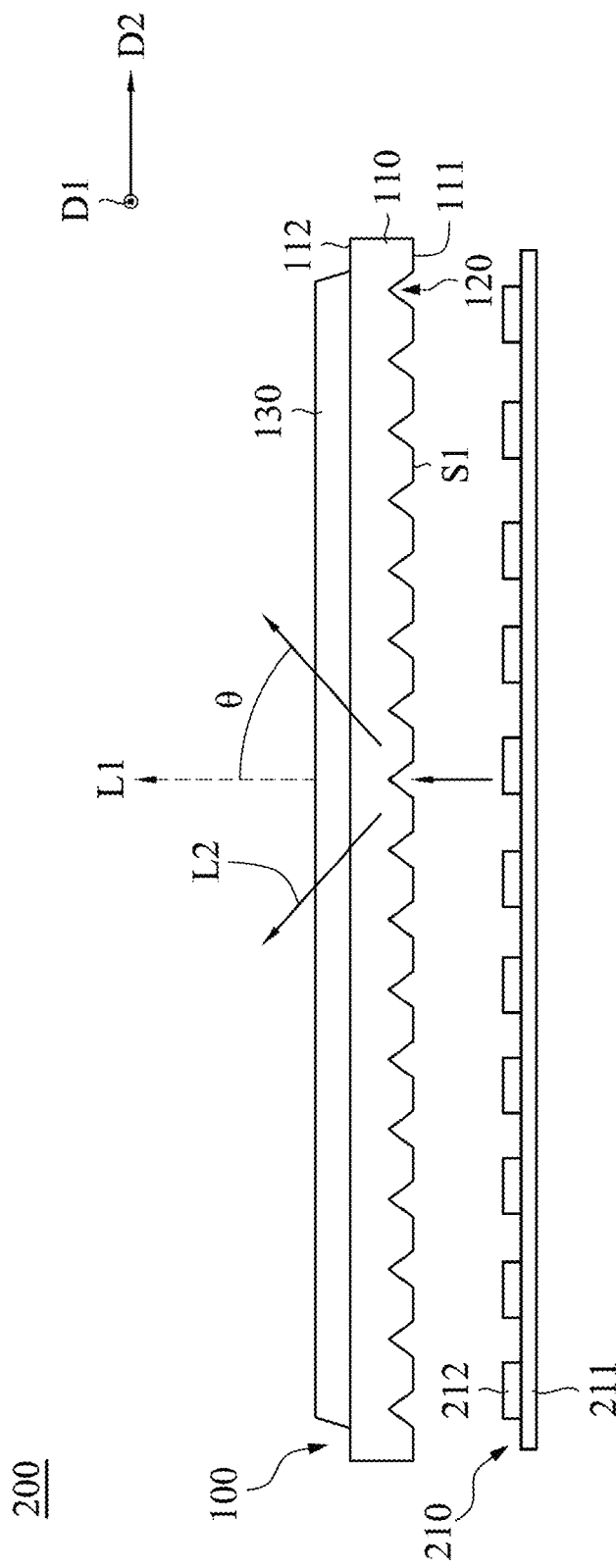
FIG. 1 illustrates a schematic diagram of an optical film applied in a direct type backlight module in accordance with an embodiment of the present disclosure.
Figure 8:
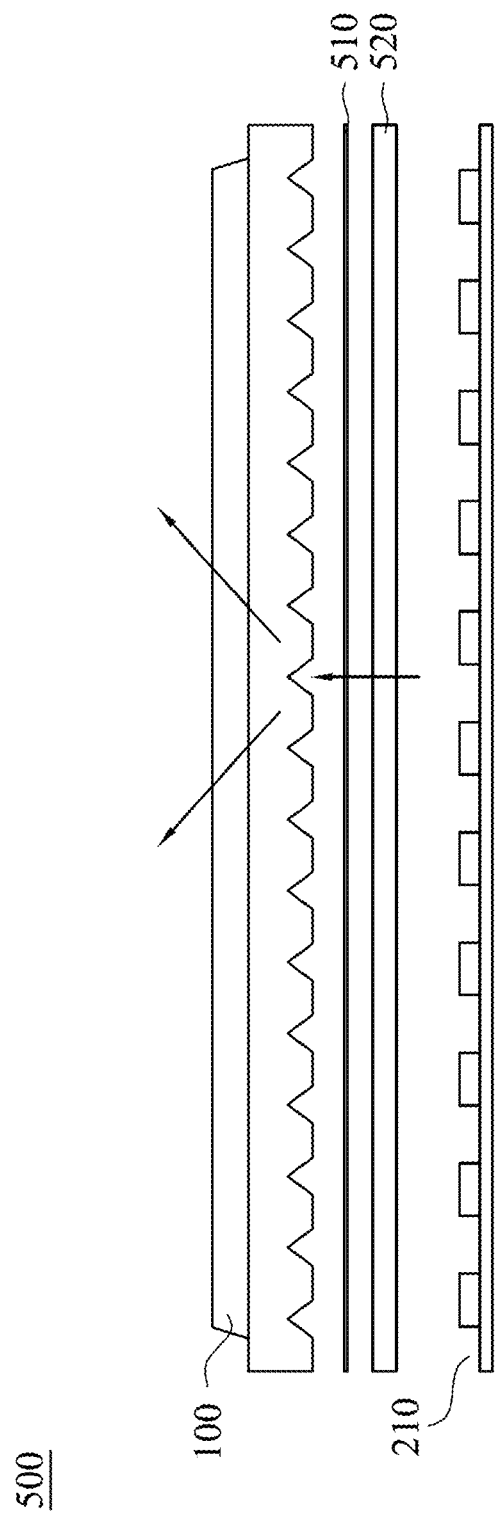
FIG. 8 illustrates a schematic diagram of an optical film applied in a direct type backlight module in accordance with an embodiment of the present disclosure.
Figure 9:
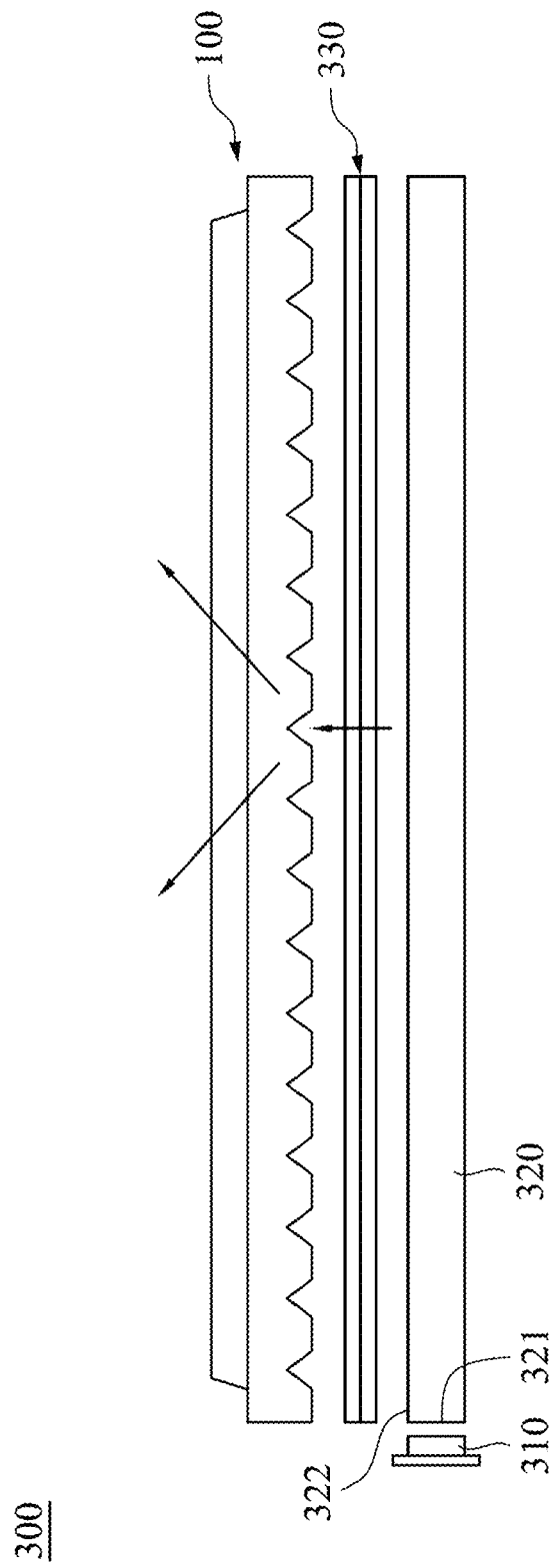
FIG. 9 illustrates a schematic diagram of an optical film applied in an edge type backlight module in accordance with an embodiment of the present disclosure.

Referring to FIG. 1, FIG. 1 illustrates a schematic diagram of an optical film applied in a direct type backlight module in accordance with an embodiment of the present disclosure. An optical film 100 of the present embodiment is mainly applied in a direct type backlight module 200 as shown in FIG. 1, a direct type backlight module 500 as shown in FIG. 8, or an edge type backlight module 300 as shown in FIG. 9, so as to increase a viewing angle of the backlight module 200 or the backlight module 300. In the backlight module 200 as shown in FIG. 1, the optical film 100 is disposed in front of a light source 210. The light source 210 includes a substrate 211 and plural light emitting units 212 arranged on the substrate 211. Therefore, a light provided from the light source 210 can directly pass through the optical film 100, and be emitted from the optical film 100.

As shown in FIG. 1, the optical film 100 of the present embodiment mainly includes a main body 110, plural first prism structures 120 and plural second prism structures 130. The main body 110 has a first optical surface 111 and a second optical surface 112, the first prism structures 120 are disposed on the first optical surface 111, and the second prism structure 130 is disposed on the second optical surface 112. As shown in FIG. 1, the first prism structure 120 has a first extending direction D1, and the second prism structure 130 has a second extending direction D2, in which the first extending direction D1 is different from the second extending direction D2. Therefore, after light enters the optical film 100 from the first optical surface 111, the first prism structure 120 can turn a portion of the straight light into light with other directions, and further make the light in other directions pass the second prism structure 130 of the second optical surface 112 and emit from the second optical surface 112. Specifically speaking, as shown in FIG. 1, after the light is acted by the optical film 100, a portion of the light (for example, light L1) can pass through blank portions S1 between the first prism structures 120 and emit along a front view direction, and a portion of the light (for example, light L2) can be acted by the first prism structures 120 and emit along a side view direction. The aforementioned front view direction is the light parallel to a normal direction of the optical film 100, and there is an included angle θ between the side view direction and the front view direction. More specifically speaking, the front view direction is parallel to a light emitting normal direction of the optical film, and the included angle θ between the side view direction and the front view direction is greater than 40 degrees, including an endpoint value. Therefore, the optical film 100 of the present disclosure can further turn a portion of the straight light into other viewing angle and adjust a scale of the viewing angle in a horizontal direction to enlarge the side viewing angle so that an electric current does not need to be increased to level up the entire luminance, and by doing this, the specific viewing angle and the specific luminance can be conformed and an electric power can be saved at the same time.

Figure 2:
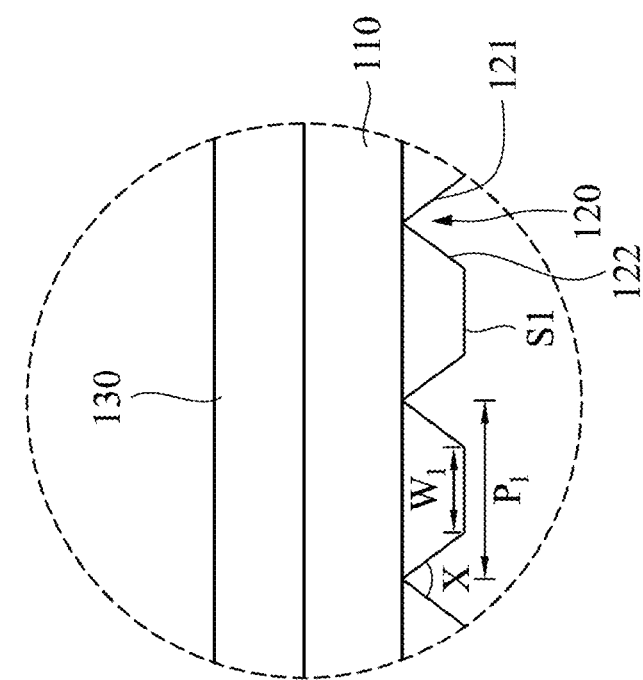
FIG. 2 illustrates a local view of an optical film in accordance with an embodiment of the present disclosure.

In the present embodiment, each first prism structure 120 is a stripe structure protruding from the first optical surface 111. In other embodiments, the first prism structures 120 can also be stripe structures recessed into the first optical surface 111. In some embodiments, an included angle between the first extending direction D1 and the second extending direction D2 is 90 degrees. Referring to FIG. 2 simultaneously, FIG. 2 illustrates a local view of an optical film in accordance with an embodiment of the present disclosure. In an embodiment, each first prism structures 120 has a first side surface 121 and a second side surface 122 connected to the first side surface 121, and there is an included angle X between the first side surface 121 and the second side surface 122. The first prism structure 120 has an arrangement density Y, and a pitch $P_1$ is between every two of the adjacent first prism structure 120. The blank portion S1 has a width $W_1$. The arrangement density is derived by computation according to a function, in which the function is shown as follow: $Y=(P_1-W_1)/P_1$.

In the present embodiment, after the light is acted by the optical film 100, a ratio of a light output L2 emitted from the side view direction and a light output L1 emitted from the front view direction is greater than or equal to 0.4. That is, when the ratio of the light luminance from the side view of the optical film 100 to the light luminance from the front view of the optical film 100 is required to be more than 40%, a design of the first prism structure 120 has to conform a relation: the relation is $$Y \geq 0.441+0.01249X-3.2875*10^{-4}X^2+1.95833*10^{-6}X^3.$$

Figure 3:
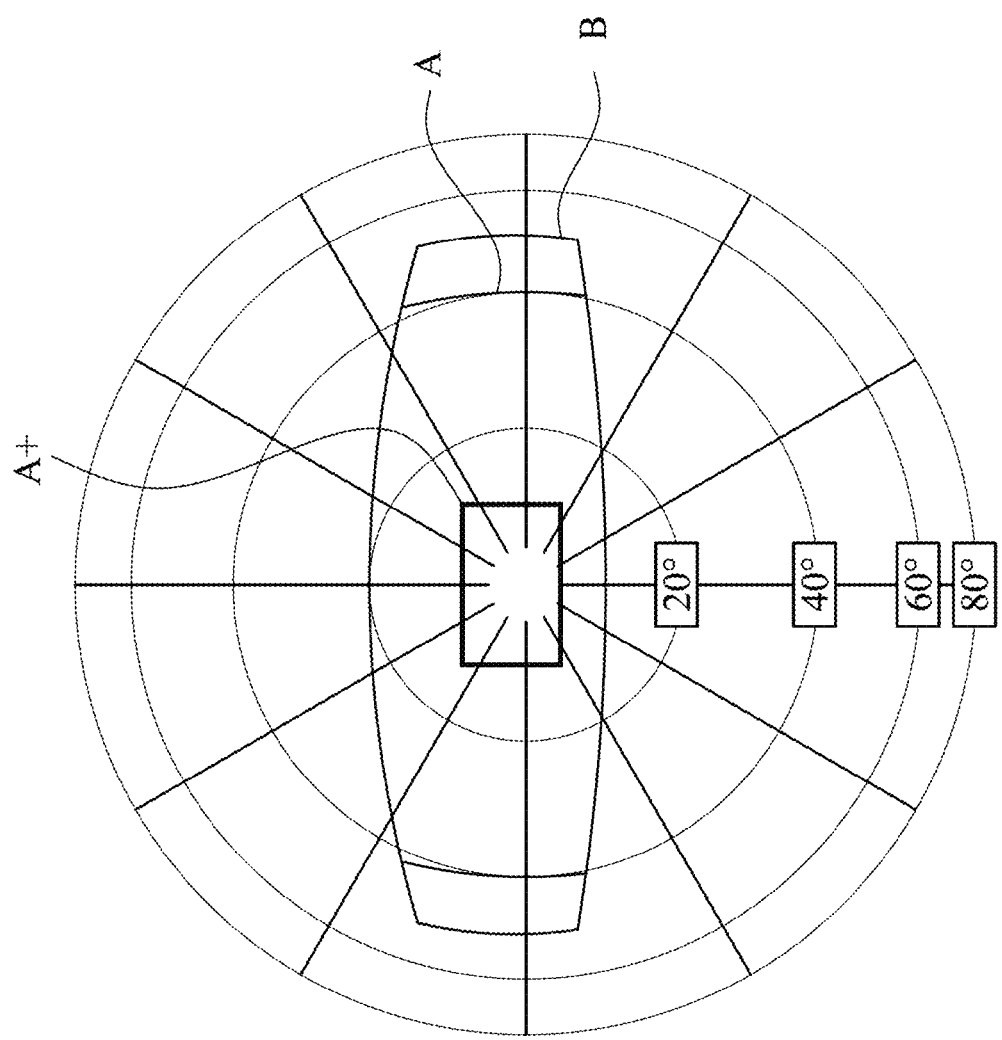
FIG. 3 illustrates a schematic diagram of a standard for display device of automobiles defined by Deutsches Flachdisplay Forum.

Referring to FIG. 3 and Table 1, FIG. 3 illustrates a schematic diagram of a conventional viewing angle standard of a display device for automobiles defined by Deutsches Flachdisplay Forum standard from Europe Union. In order to consider the viewing angle of the driver and the passenger, for example, an area A+, an area A and an area B as shown in FIG. 3, a ratio of a light output emitted from the side view direction of the display device for automobiles (that is, a luminance of the area B usually refers to the lowest briqhtness between ±50 degrees) to a light output emitted from the front view direction of the display device for automobiles (that is, a luminance of the area A+ usually refers to the lowest briqhtness between ±10 degrees) is required to be more than 37.5% at least. The present embodiment employs a standard higher than Deutsches Flachdisplay Forum standard from Europe Union. The present embodiment required the ratio of the light output emitted from the side view direction to the light output emitted from the front view direction is greater than or equal to 40% (that is, greater than 37.5%), therefore, designing the optical film 100 by using the relation of the present embodiment can enlarge the viewing angle of light emitting and conform the prescription about the luminance of the display device for automobiles defined by Deutsches Flachdisplay Forum standard from Europe Union.

TABLE 1

Ranges of viewing angle in various areas in FIG. 3 and Deutsches Flachdisplay Forum standard from EU Union

| Area | Range of view angle (horizontal, vertical) [degree] | Deutsches Flachdisplay Forum norm from Europe Union[cd/m²] |
|---|---|---|
| A+ | (−10, 8) (10, 8) (10, 4) (10, 4) | >800(100%) |
| A | (−40, 20) (40, 20) (40, −10) (−40, −10) | >450(56.3%) |
| B | (50, 20) (50, 20) (50, −10) (−50, −10) | >300(37.5%) |

Figure 4:
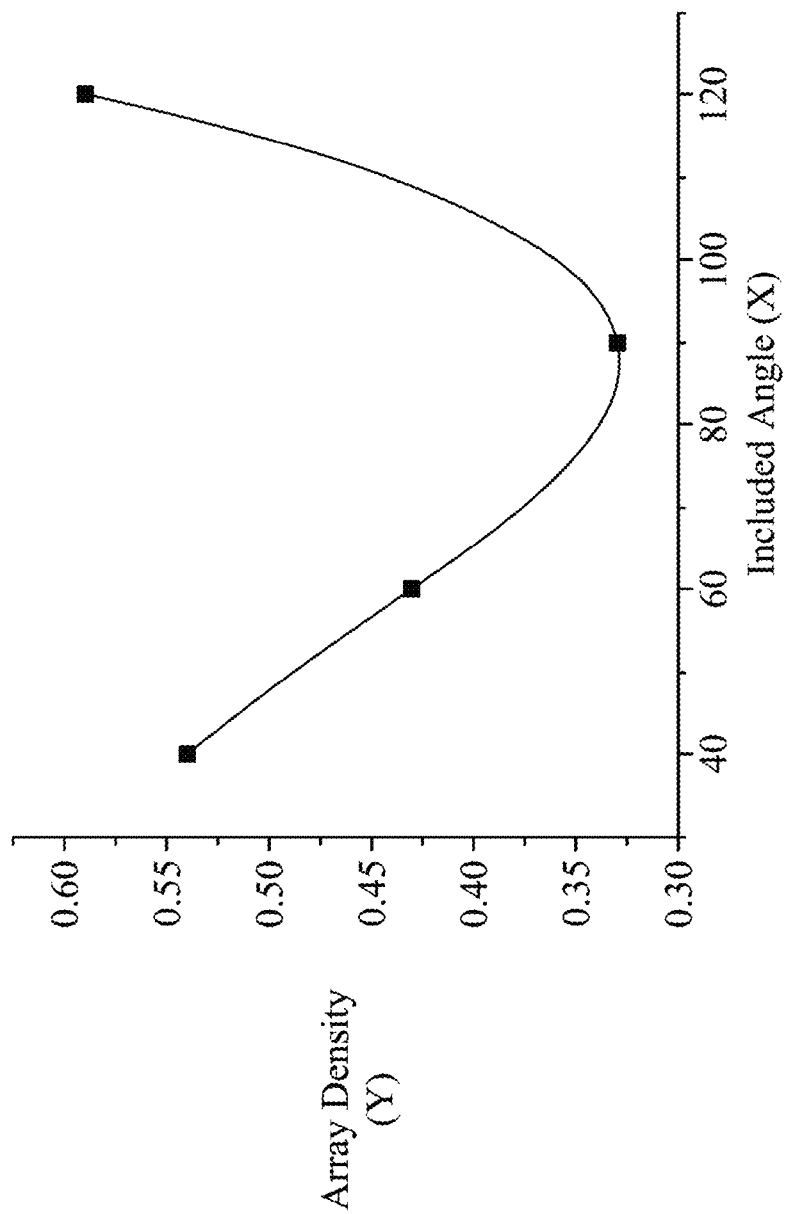
FIG. 4 illustrates a curved line graph of an included angle (X) and an arrangement density (Y) of a first prism structure in accordance with an embodiment of the present disclosure.
Figure 5:
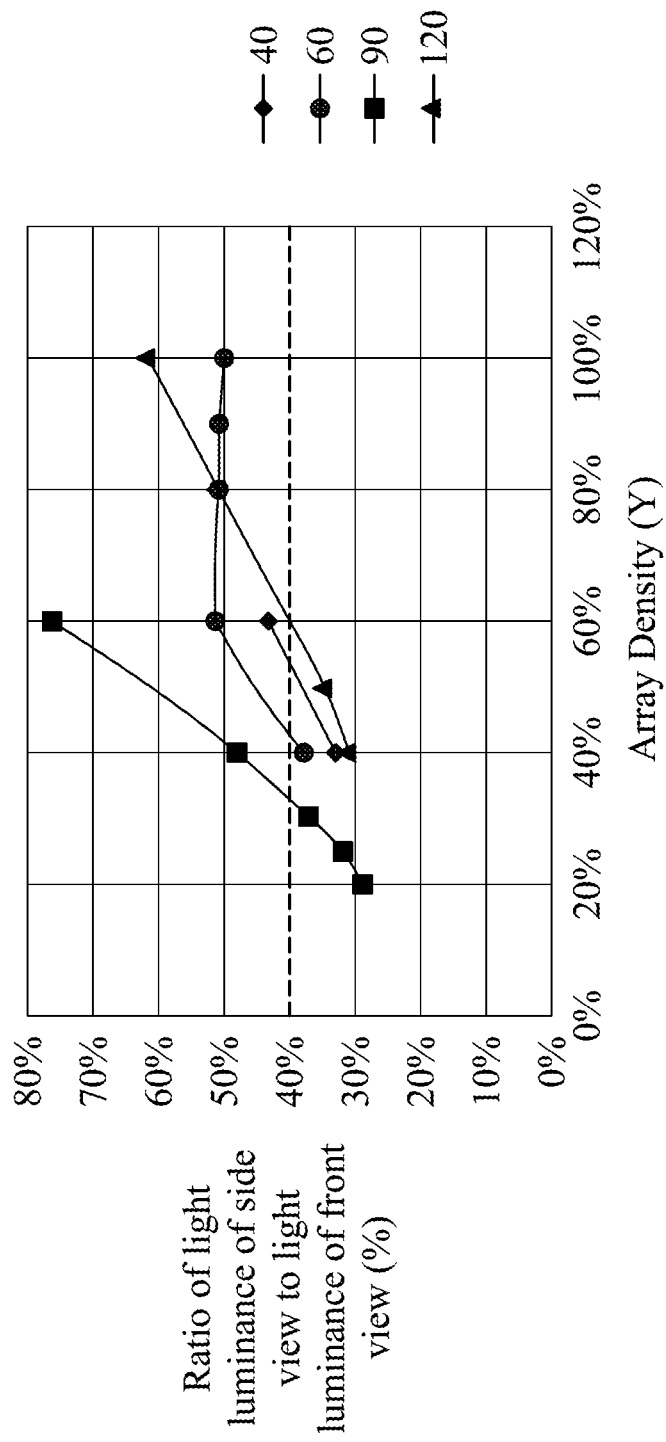
FIG. 5 illustrates a schematic diagram produced by using ratios of a luminance of side view light emitting to a luminance of front view light emitting of the first prism structure with different included angles and different arranged densities in accordance with an embodiment of the present disclosure.

Referring to FIG. 4 and FIG. 5, FIG. 4 illustrates a curved line graph of an included angle (X) and an arrangement density (Y) of a first prism structure in accordance with an embodiment of the present disclosure, and FIG. 5 illustrates a schematic diagram produced by using ratios of a luminance of side view light emitting to a luminance of front view light emitting of the first prism structure calculated respectively with different included angles and different arranged densities in accordance with an embodiment of the present disclosure. It can be seen from FIG. 4 and FIG. 5 that when the ratio of the luminance of light emitting of side view to the luminance of light emitting of front view of the optical film is 40%, the included angle X of the first prism structures 120 can be set to be 40 degrees and the arrangement density of the first prism structures 120 can set to be 54%, or the included angle X of the first prism structures 120 can be set to be 60 degrees and the arrangement density of the first prism structures 120 can set to be 43%, or the included angle X of the first prism structures 120 can be set to be 90 degrees and the arrangement density of the first prism structures 120 can set to be 33%, or the included angle X of the first prism structures 120 can be set to be 120 degrees and the arrangement density of the first prism structures 120 can set to be 59%, so as to satisfy the specific requirement of the viewing angle of light emitting.

Figure 6B:
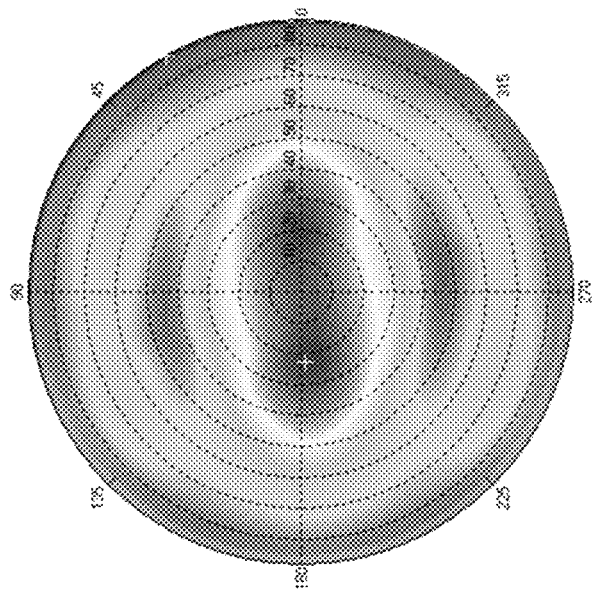
FIG. 6B illustrates a simulation diagram of light emitting luminance of an optical film of a first prism structure in various viewing angles in accordance with an embodiment of the present disclosure.
Figure 6A:
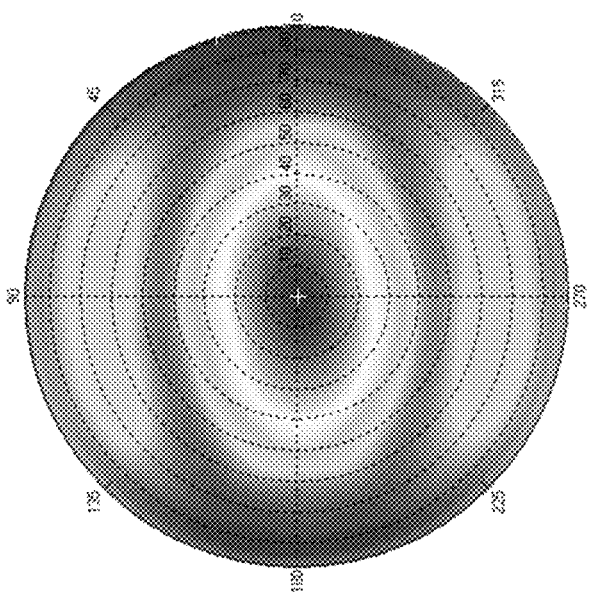
FIG. 6A illustrates a simulation diagram of light emitting luminance of a conventional optical film in various viewing angles.

Referring to FIG. 6A and FIG. 6B, FIG. 6A illustrates a simulation diagram of light emitting luminance of a conventional optical film in various viewing angles, and FIG. 6B illustrates a simulation diagram of light emitting luminance of an optical film of a first prism structure in various viewing angles in accordance with an embodiment of the present disclosure. Comparing with the simulation diagram of light emitting luminance of a conventional optical film of FIG. 6A, it is apparent that dark regions of the embodiment of FIG. 6B are separated into two regions and a luminance of light emitting of front viewing angle is decreased so that the energy cost of light emitting of front viewing angle can be reduced and luminance of side view of a driver seat and a passenger seat are increased, whereas the comparative examples of general prism sheets or films not obeying the relation cannot separate the dark region into two regions so that a goal of the present invention cannot be achieved.

It is noted that the present disclosure is not limited to the aforementioned included angles and the arrangement density, the relation of the present disclosure is used to derive the corresponding included angle X of the first prism structures 120 and the arrangement density of the first prism structures 120 according to the ratio requirement of the light luminance. For example, the curved line in FIG. 4 denotes a curved line of a relationship between the included angle X of the first prism structures 120 and the arrangement density of the first prism structures 120 when the ratio of the light luminance of the side view of the optical film 100 to the ratio of the light luminance of the front view of the optical film 100 is equal to 40%. A region above the curved line denotes the higher ratio of the light luminance of the side view to the light luminance of the front view and the relation between the included angle X of the first prism structures 120 and the arrangement density of the first prism structures 120. Taking the point where the included angle X of the first prism structure 120 is 90 degrees as an example, when the included angle X of the first prism structure 120 is 90 degrees, the arrangement density is 33%, and the ratio of the light luminance of the side view to the light luminance of the front view is 40%. When the ratio of the light luminance of the side view to the light luminance of the front view is required to be higher, in the same condition that the included angle X of the first prism structure 120 is 90 degrees, the ratio of the light luminance of the side view to the light luminance of the front view can be increased by increasing the arrangement density of the first prism structure 120, for example, the arrangement density is set to be higher than 33%.

Figure 7:
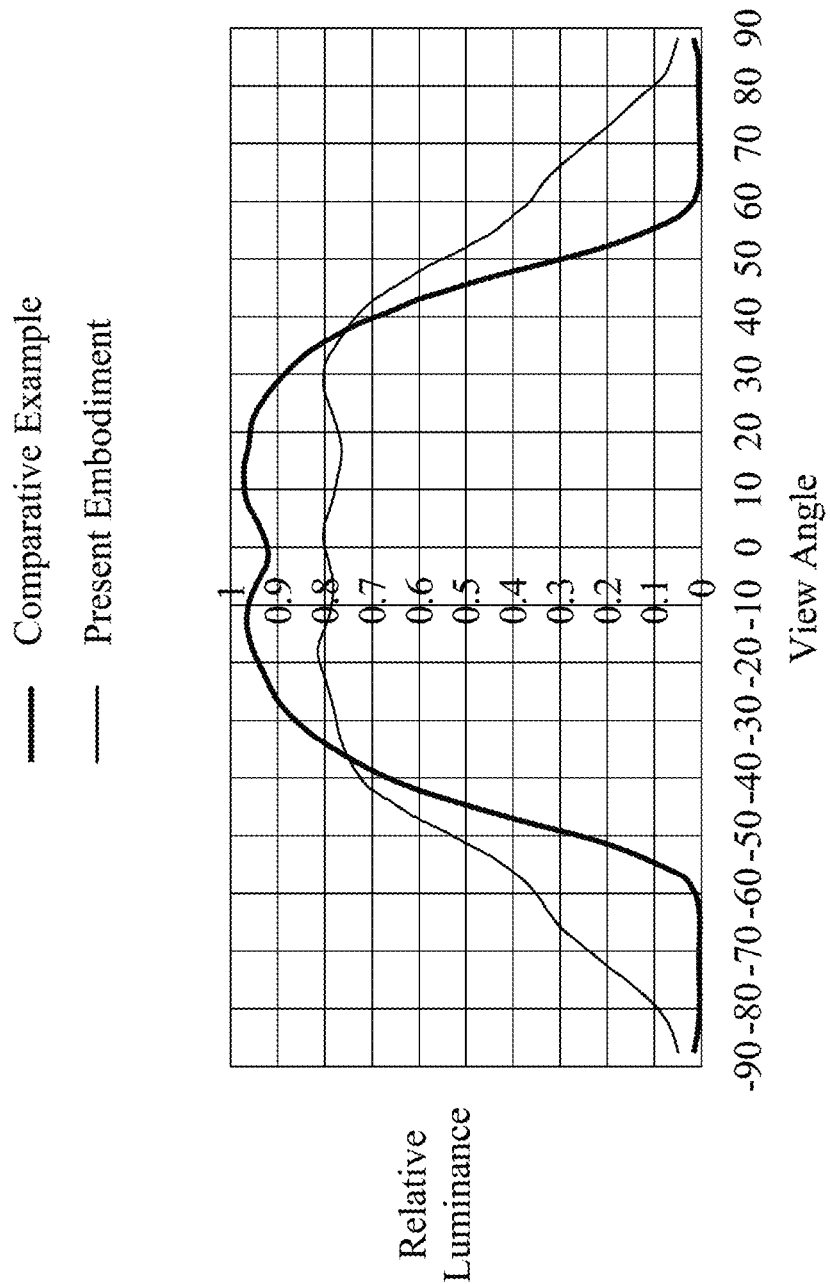
FIG. 7 illustrates a simulation curved line graph of a viewing angle and a brightness of an optical film in accordance with an embodiment of the present disclosure and a conventional optical film of the comparative example respectively.

Referring to FIG. 7, FIG. 7 illustrates a simulation curved line graph of a viewing angle and a brightness of an optical film with an embodiment of the present disclosure and an optical film of the comparative example respectively. The optical film of the comparative example is a general one-sided prism sheet. According to FIG. 7, after light passes through the general one-sided prism sheet and is emitted, the luminance of light emitting is higher in the range of light emitting viewing angle between −40 degrees and 40 degrees; whereas after the light passes through the optical film 100 of the embodiment of the present disclosure, even a luminance of the light emitted from the optical film 100 in the range between −30 degrees and 30 degrees is lower than a luminance of the light emitting of the front viewing angle of the optical film of the comparative example, the luminance of light emitting out of the range of the viewing angle between −40 degrees and 40 degrees is higher, for example, a relative luminance in the range between −50 degrees and 50 degrees increases from 0.3 to 0.5. That is, the optical film 100 of the present disclosure can reduce the luminance of light emitting of the front viewing angle in order to reduce an energy cost of light emitting of the front viewing angle and increase the luminance of the side viewing angle of the driver seat and the passenger seat, so as to satisfy the requirement of display device for automobiles.

Referring to FIG. 8, FIG. 8 illustrates a schematic diagram of an optical film applied in a direct type backlight module in accordance with an embodiment of the present disclosure. A backlight module of the present embodiment includes a light source 210, a diffusing film 510, a diffusing board 520 and an optical film 100. In the backlight module 500 as shown in FIG. 8, the optical film 100 is disposed in front of the light source 210. The diffusing film 510 and the diffusing board 520 are disposed between the light source 210 and the optical film 100. Therefore, a light provided from the light source 210 can pass through the diffusing film 510 and the diffusing board 520, enter the optical film 100, and form a light emitting of wide viewing angle by the optical film 100.

Referring to FIG. 9, FIG. 9 illustrates a schematic diagram of an optical film applied in an edge type backlight module in accordance with an embodiment of the present disclosure. The optical film 100 of the present disclosure can also be applied in the edge type backlight module 300. The backlight module 300 includes a light source 310, a light guide plate 320, a film set 330 and the optical film 100. The light source 310 is disposed near a light incident surface 321 of the light guide plate 320, and the optical film 100 is disposed in front of the light emitting surface 322 of the light guide plate 320. The film set 330 is disposed between the light guide plate 320 and the optical film 100. Therefore, a light provided from the light source 310 can enter into the light guide plate 320 and form a surface light source. After light is emitted from the surface light source, it can pass through the film set 330, enter into the optical film 100, and form a light emitting of wide viewing angle by the optical film 100.

Figure 10:
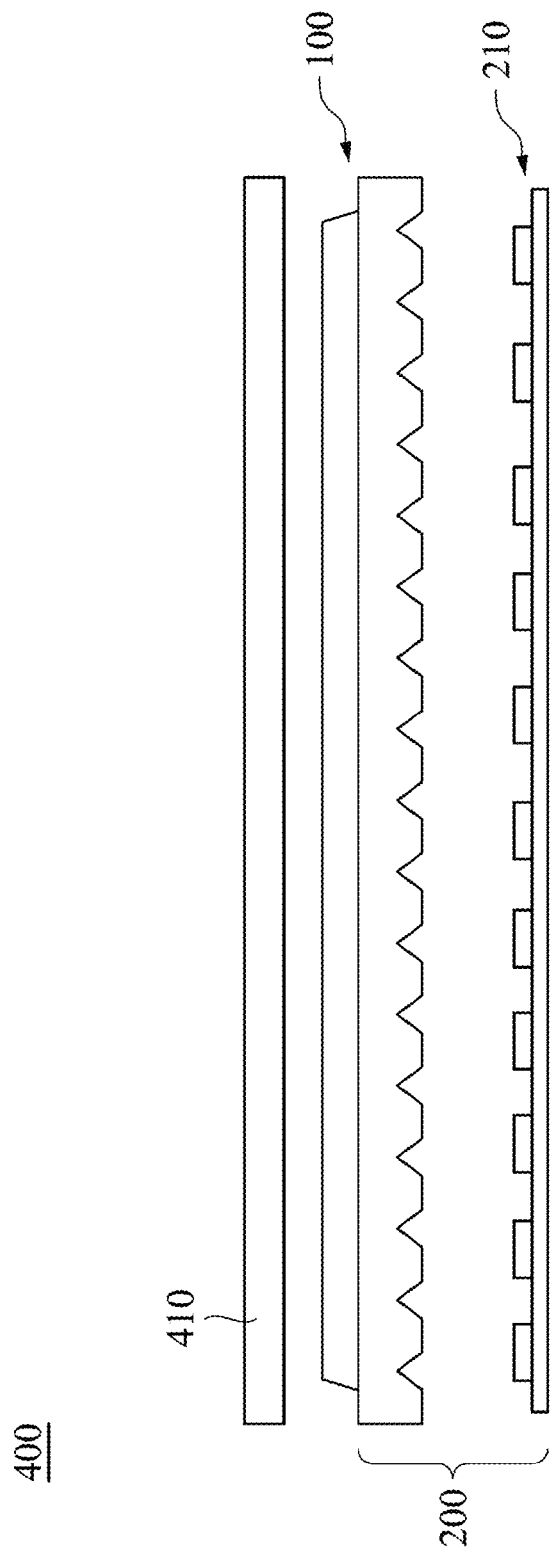
FIG. 10 illustrates a schematic diagram of a display device in accordance with an embodiment of the present disclosure.

Referring to FIG. 10, FIG. 10 illustrates a schematic diagram of a display device in accordance with an embodiment of the present disclosure. A display device 400 includes the backlight module 200 as shown in FIG. 1 and a display panel 410. The display panel 410 is disposed in front of the backlight module 200. Therefore, the display device 400 also achieves the objective of reducing the light luminance of the front viewing angle and increasing the light luminance of the side viewing angle by the design of the optical film 100 in the backlight module 200, hence the statement of guiding light will not be repeated here. The backlight module 200 as shown in FIG. 1 is applied in the display device 400 just for being an exemplary explanation, and is not used to limit the present disclosure. All of the backlight module (for example, the backlight module 300 as shown in FIG. 9) of the other aforementioned embodiments can be applied in the display device, so as to produce the same effect of enlarging the viewing angle.

Figure 11:
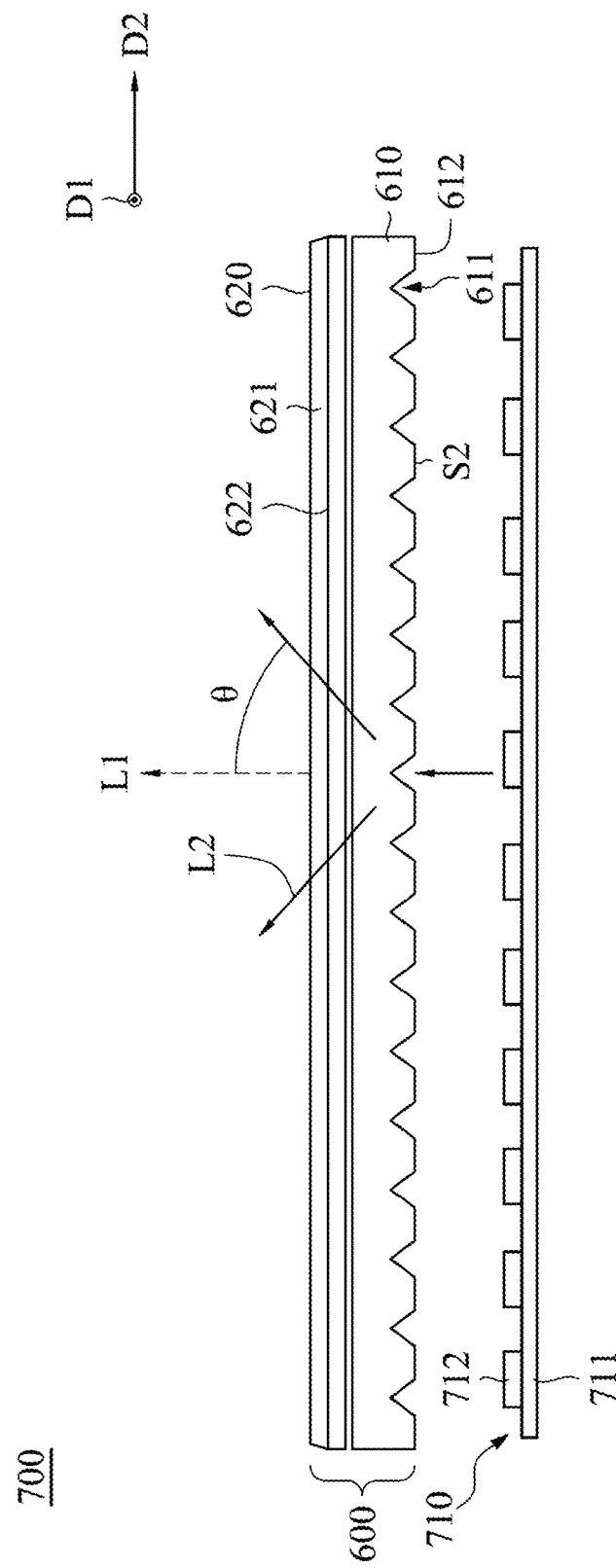
FIG. 11 illustrates a schematic diagram of an optical film set applied in a direct type backlight module in accordance with an embodiment of the present disclosure.
Figure 13:
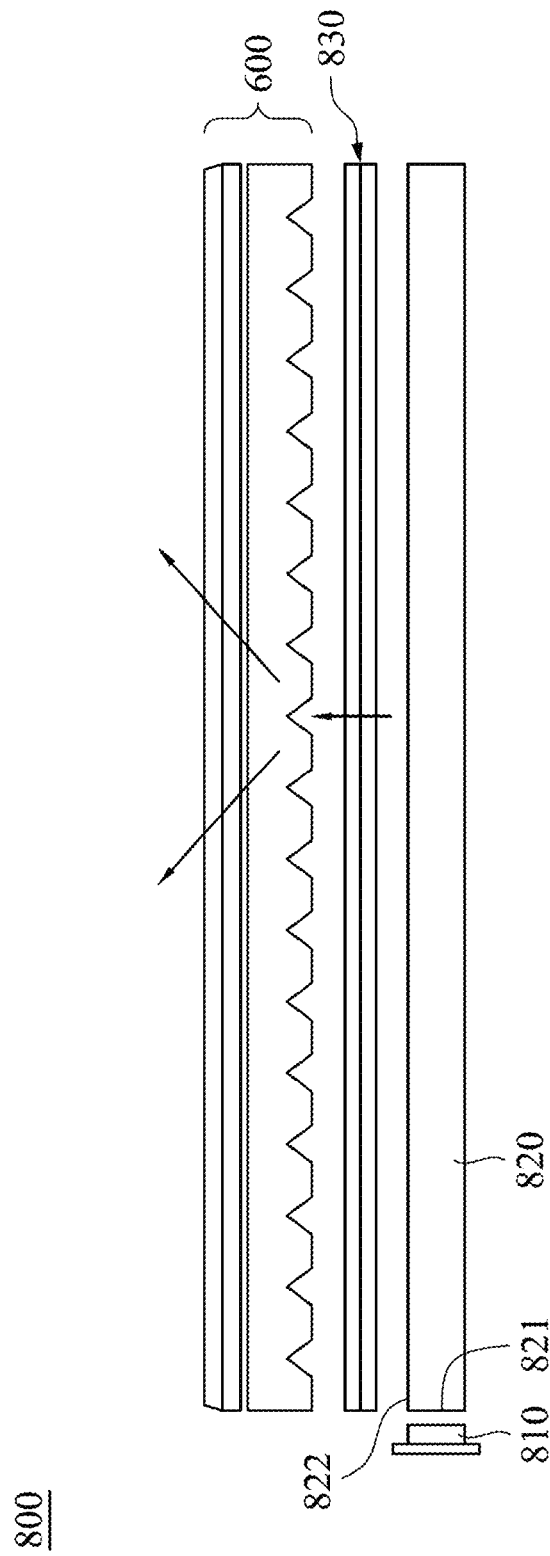
FIG. 13 illustrates a schematic diagram of an optical film set applied in an edge type backlight module in accordance with an embodiment of the present disclosure.

Referring to FIG. 11, FIG. 11 illustrates a schematic diagram of an optical film set applied in a direct type backlight module in accordance with an embodiment of the present disclosure. The optical film set 600 can mainly be applied in a direct type backlight module 700 as shown in FIG. 11, or be applied in an edge type backlight module 800 as shown in FIG. 13, so as to increase the viewing angle of light emitting of the backlight module 700 or the viewing angle of light emitting of the backlight module 800. In the backlight module 700 as shown in FIG. 11, an optical film 600 is disposed in front of a light source 710. A light source 710 includes a substrate 711 and plural light emitting units 712 arranged on the substrate 711. Therefore, a light provided from the light source 710 can directly pass the optical film set 600 and be emitted out from the optical film set 600.

As shown in FIG. 11, the optical film set 600 of the present embodiment includes a first film 610 and a second film 620. The first film 610 has a first optical surface 612 and plural first prism structures 611, the second film 620 has a second optical surface 622 and plural second prism structures 621, and the second prism structures 621 are disposed on the second optical surface. As shown in FIG. 11, the first prism structure 611 has a first extending direction D1, and the second prism structure 621 has a second extending direction D2, in which the first extending direction D1 is different from the second extending direction D2. Therefore, after a light enters the optical film set 600 from a first optical surface 612, a portion of the light which travels along normal direction can be diverted to travel along other directions and pass through the second prism structures 621 on the second optical surface 622 and be emitted. Specifically speaking, as shown in FIG. 11, after the light is acted by the optical film 600, a portion of light (for example, a light L1) can pass through blank portion S2 between the first prism structures 611 and be emitted along a front view direction, a portion of light (for example, a light L2) can be acted by the first prism structures 611 and be emitted along a side view direction. The aforementioned front view direction of the light is a direction parallel to a normal direction of the optical film set 600, and an included angle θ is between the side view direction and the front view direction. Specifically speaking, the front view direction is parallel to a light emitting normal line of the optical film set 600, and the included angle θ between the side view direction and the light emitting normal line is greater than 40 degrees, including an endpoint value. As a result, by the optical film set 600 of the present embodiment, a portion of the light which travels along normal direction can be diverted to travel along other directions, thereby a scale of the viewing angle in a horizontal direction can be adjusted to enlarge the side viewing angle so that an electric current does not need to be increased to level up the entire luminance, and by doing this, the specific viewing angle and the specific luminance can be conformed and an electric power can be saved at the same time.

Figure 12:
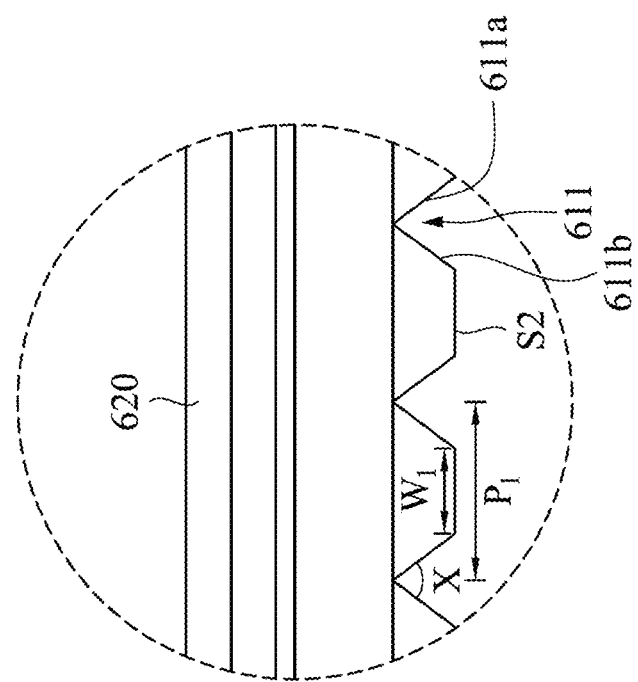
FIG. 12 illustrates a local view of an optical film set in accordance with an embodiment of the present disclosure.

In the present embodiment, each first prism structure 611 is a convex stripe structure protruding from the first optical surface 612. In other embodiments, the first prism structures 611 can also be concave stripe structures recessed into the first optical surface 612. In some embodiments, an included angle between the first extending direction D1 and the second extending direction D2 is 90 degrees. Referring to FIG. 12 simultaneously, FIG. 12 illustrates a local view of an optical film set in accordance with an embodiment of the present disclosure. In an embodiment, each first prism structures 611 has a first side surface 611a and a second side surface 611b connected to the first side surface 611a, and there is an included angle X between the first side surface 611a and the second side surface 611b. The first prism structure 611 has an arrangement density Y, and a pitch $P_1$ is between every two of the adjacent first prism structure 611. The blank portion S2 has a width $W_1$. The arrangement density is derived by computation according to a function, in which the function is shown as follow: $Y=(P_1-W_1)/P_1$.

In the present embodiment, after the light is acted by the optical film set 600, a ratio of a light L2 luminance from the side view direction to a light L1 luminance from the front view direction is greater than or equal to 0.4. That is, when the ratio of the light luminance from the side view of the optical film set 600 to the light luminance from the front view of the optical film set 600 is required to be more than 40%, a design of the first prism structure 611 has to conform a relation: the relation is $$Y \geq 0.441+0.01249X-3.2875*10-4X^2+1.95833*10^{-6}X^3.$$

Referring to FIG. 13, FIG. 13 illustrates a schematic diagram of an optical film set applied in an edge type backlight module in accordance with an embodiment of the present disclosure. The optical film set 600 of the present disclosure can also be applied in an edge type backlight module 800. The backlight module 800 includes a light source 810, a light guide plate 820, a film set 830 and the optical film set 600. The light source 810 is disposed near a light incident surface 821 of the light guide plate 820, and the optical film set 600 is disposed in front of the light emitting surface 822 of the light guide plate 820. The film set 830 is disposed between the light guide plate 820 and the optical film set 600. Therefore, a light provided from the light source 810 can enter into the light guide plate 820 and form a surface light source. After light is emitted from the surface light source, it can pass through the film set 830, enter into the optical film set 600, and form a light emission of wide viewing angle after an act by the optical film set 600.

Figure 14:
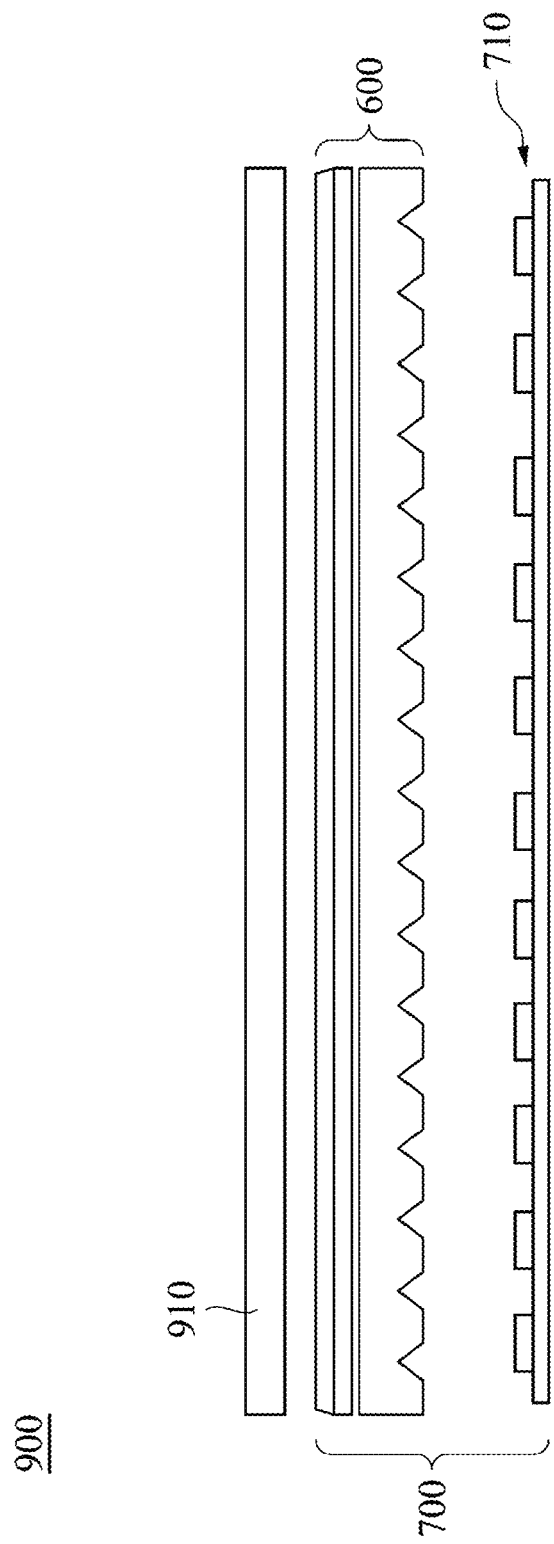
FIG. 14 illustrates a schematic diagram of a display device in accordance with an embodiment of the present disclosure.

Referring to FIG. 14, FIG. 14 illustrates a schematic diagram of a display device in accordance with an embodiment of the present disclosure. A display device 900 includes the backlight module 700 as shown in FIG. 11 and a display panel 910. The display panel 910 is disposed in front of the backlight module 700. Therefore, the display device 900 also achieves the objective of reducing the light luminance of the front viewing angle and increasing the light luminance of the side viewing angle by the design of the optical film set 600 in the backlight module 700, hence the statement of guiding light will not be repeated here. The backlight module 700 as shown in FIG. 11 is applied in the display device 900 just for being an exemplary explanation, and is not used to limit the present disclosure. All of the backlight module (for example, the backlight module 800 as shown in FIG. 13) of the other aforementioned embodiments can be applied in the display device, so as to produce the same effect of enlarging the viewing angle.

According to the embodiments of the present disclosure, the present disclosure mainly uses the design of the first prism structures and the second prism structures on the optical film set or on the optical film so that a portion of the light which travels along normal direction can be diverted to travel along other directions, thereby increasing the entire range of viewing angle. The specific viewing angle can be achieved without increasing the current to level up the entire luminance. On the other hand, the variation of angle and the arrangement density of the first prism structures and the second prism structures can be designed according to the relation of the present embodiment, so as to conform the various requirements of the viewing angle of the display device for automobiles.

What is claimed is:

1. An optical film, comprising:
    a main body having a first optical surface and a second optical surface opposite to each other;
    a plurality of first prism structures disposed on the first optical surface, wherein each of the first prism structures has a first extending direction; and
    a plurality of second prism structures disposed on the second optical surface, wherein each of the second prism structures has a second extending direction; and
    wherein the first extending direction is different from the second extending direction;
    wherein after a light enters the main body from one of the first optical surface and the second optical surface, and is emitted from another one of the first optical surface and the second optical surface, a portion of the light is emitted along a front view direction, another portion of the light is emitted along a side view direction, wherein a ratio of a light luminance from the side view direction to a light luminance from the front view direction is greater than 0.4, comprising an endpoint value.

2. The optical film of claim 1, wherein the first prism structures has an arrangement density Y, each of the first prism structures has a first side surface and a second side surface connected to the first side surface, and an included angle X is formed between the first side surface and the second side surface, wherein the arrangement density Y and the included angle X satisfy a relation, the relation is:

$$Y \geq 0.441+0.01249X-3.2875*10^{-4}X^2+1.95833*10^{-6}X^3.$$

3. The optical film of claim 2, wherein a blank portion is formed between every adjacent two of the first prism structures, and the arrangement density Y is calculated according to a function, wherein the function is $Y=(P_1-W_1)/P_1$, wherein $P_1$ is a pitch between every adjacent two of the first prism structures, and $W_1$ is a width of each of the blank portions.

4. The optical film of claim 1, wherein each of the first prism structures is a concave stripe structure recessed into or a convex stripe structure protruding from the first optical surface.

5. The optical film of claim 1, wherein an included angle between the first extending direction and the second extending direction is 90 degrees.

6. The optical film of claim 1, wherein the front view direction is parallel to a light emitting normal line of the optical film, and an included angle between the side view direction and the light emitting normal line is greater than 40 degrees, comprising an endpoint value.

7. A backlight module, comprising:
a light guide plate having a light incident surface and a light emitting surface;
a light source disposed near the light incident surface;
the optical film of the claim 1 disposed in front of the light emitting surface; and
a film set located between the optical film and the light guide plate.

8. A display device, comprising:
the backlight module of claim 7; and
a display panel disposed in front of the backlight module.

9. A backlight module, comprising:
a light source comprising a substrate and a plurality of light emitting units arranged on the substrate; and
the optical film of claim 1 disposed in front of the light source.

10. A display device, comprising:
the backlight module of claim 9; and
a display panel disposed in front of the backlight module.

11. An optical film set, comprising a first film and a second film, wherein:
the first film has a first optical surface and a plurality of first prism structures, wherein the first prism structures are disposed on the first optical surface, and each of the first prism structures has a first extending direction;
the second film has a second optical surface and a plurality of second prism structures, wherein the first optical surface and the second optical surface respectively face opposite directions, the second prism structures are disposed on the second optical surface, and each of the second prism structures has a second extending direction; and
wherein the first extending direction is different from the second extending directions;
wherein after a light enters the main body from one of the first optical surface and the second optical surface, and is emitted from another one of the first optical surface and the second optical surface, a portion of the light is emitted along a front view direction, another portion of the light is emitted along a side view direction, wherein a ratio of a light luminance from the side view direction to a light luminance from the front view direction is greater than 0.4, comprising an endpoint value.

12. The optical film set of claim 11, wherein the first prism structures have an arrangement density Y, and each of the first prism structures has a first side surface and a second side surface which are connected to each other, and an included angle X is formed between the first side surface and the second side surface, wherein the arrangement density Y and the included angle X satisfy a relation, and the relation is:

$$Y \geq 0.441+0.01249X-3.2875*10^{-4}X^2+1.95833*10^{-6}X^3.$$

13. The optical film set of claim 12, wherein a blank portion is formed between every adjacent two of the first prism structures, and the arrangement density Y is calculated according to a function, wherein the function is $Y=(P_1-W_1)/P_1$, wherein $P_1$ is a pitch between every adjacent two of the first prism structures, and $W_1$ is a width of each of the blank portions.

14. The optical film set of claim 11, wherein each of the first prism structures is a concave stripe structure recessed into or a convex stripe structure protruding from the first optical surface.

15. The optical film set of claim 11, wherein an included angle between the first extending direction and the second extending direction is 90 degrees.

16. The optical film set of claim 11, wherein the front view direction is parallel to a light emitting normal line of the optical film set, and an included angle between the side view direction and the light emitting normal line is greater than 40 degrees, comprising an endpoint value.

17. A backlight module, comprising:
a light guide plate having a light incident surface and a light emitting surface;
a light source disposed near the light incident surface;
the optical film set of the claim 11 disposed in front of the light incident surface; and
a film set located between the optical film set and the light guide plate.

18. A display device, comprising:
the backlight module of claim 17; and
a display panel disposed in front of the backlight module.

19. A backlight module, comprising:
a light source comprising a substrate and a plurality of light emitting units arranged on the substrate; and
the optical film set of claim 11 disposed in front of the light source.

20. A display device, comprising:
the backlight module of claim 19; and
a display panel disposed in front of the backlight module.

* * * * *